US010133771B2

(12) United States Patent
Frank et al.

(10) Patent No.: US 10,133,771 B2
(45) Date of Patent: Nov. 20, 2018

(54) OPPORTUNISTIC WAIT-TRIGGERED ELASTIC COMMIT

(71) Applicant: International Business Machines Corporation, Armonk, NY (US)

(72) Inventors: David C. Frank, Ossining, NY (US); Terri A. Menendez, Richmond, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 710 days.

(21) Appl. No.: 14/711,745

(22) Filed: May 13, 2015

(65) Prior Publication Data
US 2016/0335311 A1 Nov. 17, 2016

(51) Int. Cl.
G06F 17/30 (2006.01)
G06F 9/46 (2006.01)

(52) U.S. Cl.
CPC ........ G06F 17/30377 (2013.01); G06F 9/466 (2013.01); G06F 17/3051 (2013.01)

(58) Field of Classification Search
None
See application file for complete search history.

(56) References Cited

U.S. PATENT DOCUMENTS

| | | | | |
|---|---|---|---|---|
| 5,752,026 A | * | 5/1998 | Fortier | G06F 11/1438 705/7.33 |
| 6,714,961 B1 | | 3/2004 | Holmberg et al. | |
| 2006/0080112 A1 | | 4/2006 | Fontijn et al. | |
| 2009/0037437 A1 | * | 2/2009 | Todd | H04L 67/14 |
| 2012/0084273 A1 | * | 4/2012 | Lee | G06F 17/30351 707/703 |
| 2012/0278429 A1 | * | 11/2012 | Miura | G06F 11/2041 709/217 |
| 2012/0311273 A1 | | 12/2012 | Marathe et al. | |
| 2013/0262423 A1 | * | 10/2013 | Graefe | G06F 17/30362 707/703 |
| 2014/0181342 A1 | * | 6/2014 | Antonopoulos | G06F 9/466 710/200 |
| 2016/0070747 A1 | * | 3/2016 | Pottlapelli | G06F 17/30377 707/703 |

OTHER PUBLICATIONS

IBM, "Method for detecting condition waiting/triggering in a server farm," IP.com, Jul. 10, 2008, pp. 1-5.

* cited by examiner

*Primary Examiner* — Grace Park
*Assistant Examiner* — Aida Z Tessema
(74) *Attorney, Agent, or Firm* — Zilka-Kotab, P.C.

(57) ABSTRACT

A method is described for determining whether to trigger an early commit of a micro-batch transaction. The method includes, during the micro-batch transaction, requesting access to a record using a record retrieval get record call. The method further includes receiving a response to the record retrieval get record call, and determining whether the response includes the record or a flag. The record is processed in response to a determination that the response includes the record. Additionally, in response to a determination that the response includes the flag, it is determined whether to trigger an early commit of the micro-batch transaction.

12 Claims, 5 Drawing Sheets

OPPORTUNISTIC WAIT-TRIGGERED ELASTIC COMMIT

BACKGROUND

The present invention relates to providing shared dataset access to batch and transaction processes, and more specifically, this invention relates to avoiding contention caused by competing workloads.

Running batch workloads concurrently with online transaction processing (OLTP) workloads against a common or shared dataset provides a number of challenges. Further, the challenges due to competing workloads become more pronounced as dedicated batch windows are shortened due to globalization and 24×7 business models, etc.

To limit contention, batch jobs that cooperate with OLTP workloads typically employ a micro-batching strategy, in which a monolithic batch job is partitioned into a number of smaller batches, referred to as micro-batches, each of which is a separate transaction.

A tension between the batch and OLTP is expressed in the selection of the size of each micro-batch. Each micro-batch, as a separate transaction, retains locks on records in the micro-batch until commit. These retained locks can block other workloads, whether batch or OLTP. Accordingly, larger micro-batches can lead to significant wait times for competing workloads trying to access records already locked by the batch workload. Further, micro-batches not only hold locks required by other workloads, but they can also wait for a lock held by other workloads. A given micro-batch waiting for a lock is not only delayed by the wait, it also extends the wait of all the other workloads waiting for access to records currently locked and held by the given micro-batch.

In a higher contention system, with multiple batch jobs and high OLTP rates these micro-batch waits can lead to cascading performance problems.

BRIEF SUMMARY

A method is described for determining whether to trigger an early commit of a micro-batch transaction. The method includes, during the micro-batch transaction, requesting access to a record using a record retrieval get record call. The method further includes receiving a response to the record retrieval get record call, and determining whether the response includes the record or a flag. The record is processed in response to a determination that the response includes the record. Additionally, in response to a determination that the response includes the flag, it is determined whether to trigger an early commit of the micro-batch transaction.

Other aspects and embodiments of the present invention will become apparent from the following detailed description, which, when taken in conjunction with the drawings, illustrate by way of example the principles of the invention.

DETAILED DESCRIPTION

Figure 1:
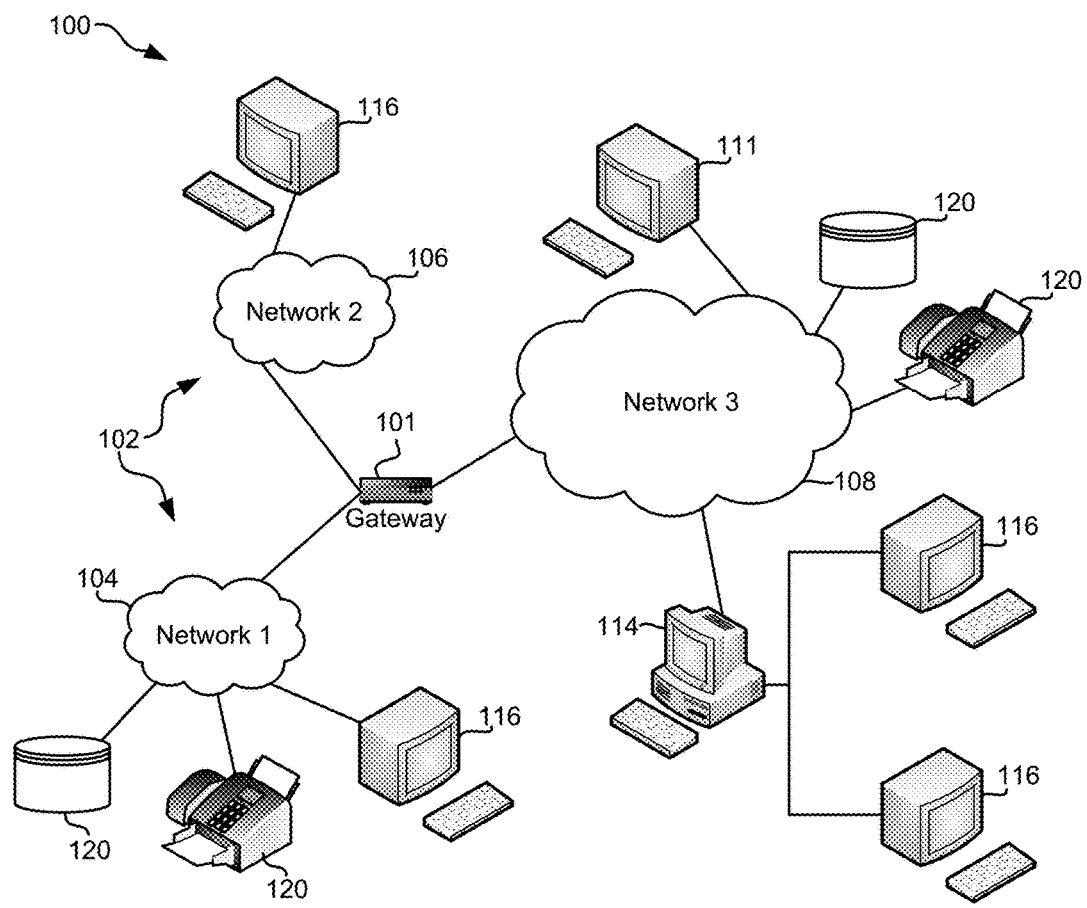
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for opportunistic wait-triggered elastic commits.

In one general embodiment, a method includes, during a micro-batch transaction, requesting access to a record using a record retrieval get record call. The method further includes receiving a response to the record retrieval get record call, and determining whether the response includes one of the record and a flag. Additionally, the record is processed in response to a determination that the response includes the record. Further, in response to a determination that the response includes the flag, it is determined whether to trigger an early commit of the micro-batch transaction.

In another general embodiment, a computer program product for processing a micro-batch transaction using an opportunistic wait-triggered elastic commit includes program instructions executable by a processor to cause the processor to, during a micro-batch transaction, request access to a record using a record retrieval get record call. The program instructions are executable by the processor to cause the processor to receive a response to the record retrieval get record call, and determine whether the response includes one of the record and a flag. Additionally, the program instructions are executable by the processor to cause the processor to, in response to a determination that the response includes the record, process the record. The program instructions are executable by the processor to cause the processor to, in response to a determination that the response includes the flag, determine whether to trigger an early commit of the micro-batch transaction.

In another general embodiment, a system includes a processor and logic integrated with and/or executable by the processor. The logic is configured to, during a micro-batch transaction, request access to a record using a record retrieval get record call. The logic is also configured to receive a response to the record retrieval get record call, and determine whether the response includes one of the record and a flag. Finally, the logic is configured to process the record in response to a determination that the response includes the record, and determine whether to trigger an early commit of the micro-batch transaction in response to a determination that the response includes the flag.

FIG. 1 illustrates an architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
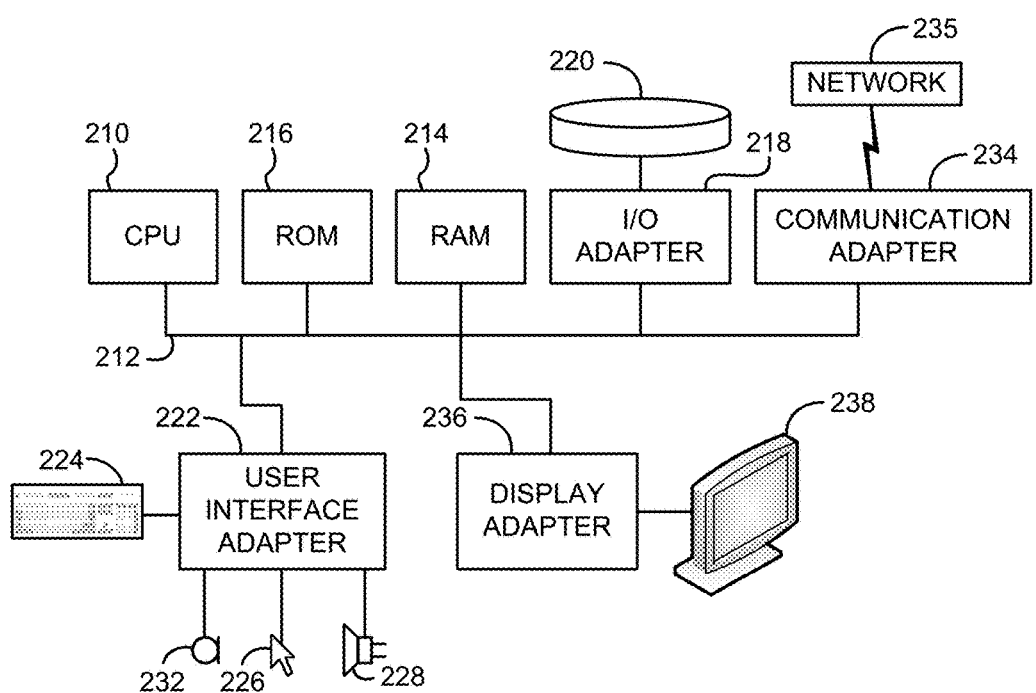
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
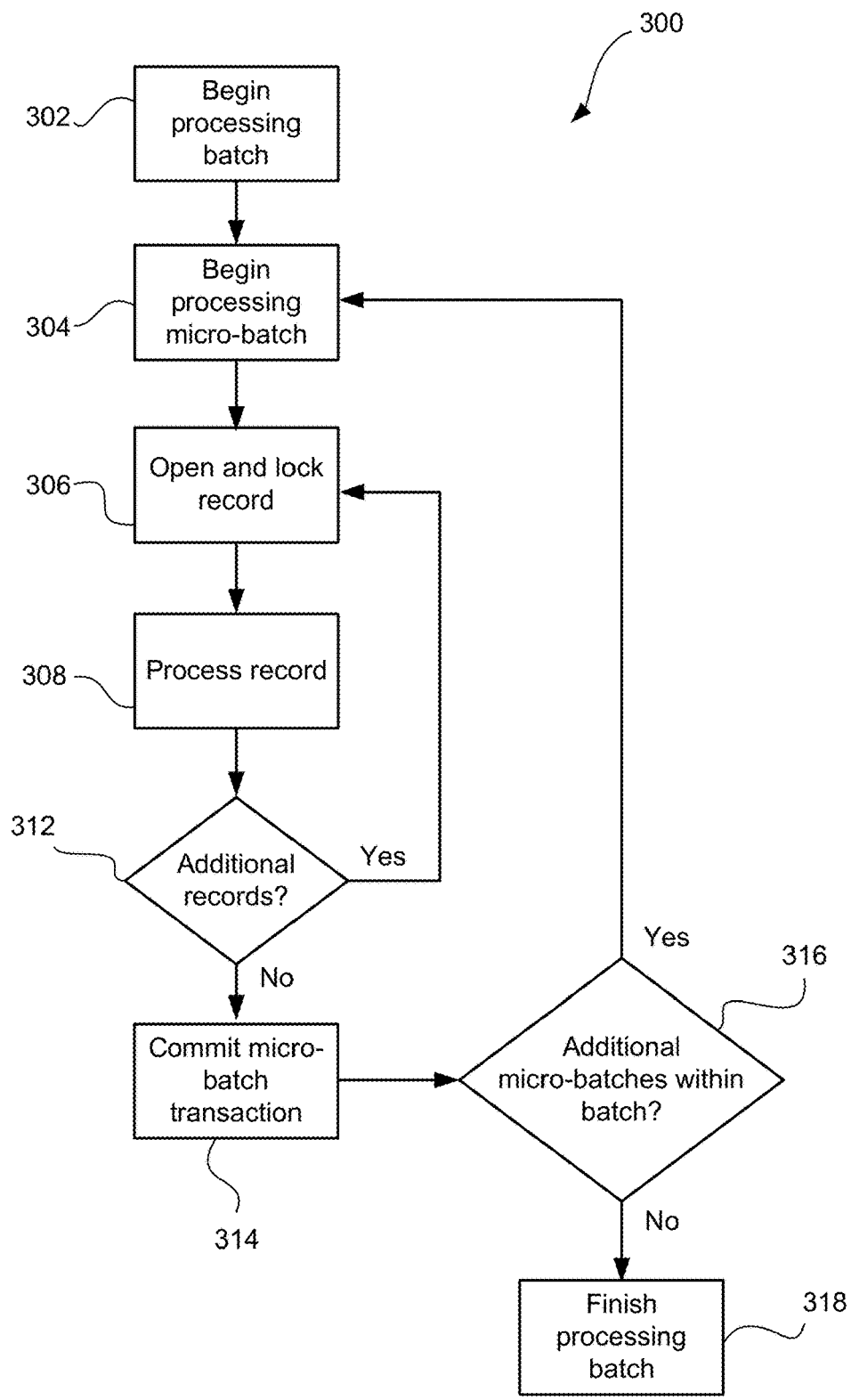
FIG. 3 illustrates a method for batch processing, in accordance with one embodiment.

Referring now to FIG. 3, a flowchart of a method 300 for batch processing is shown according to one embodiment. The method 300 for batch processing may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, the processing of a batch begins at operation 302. The batch processing may include any workload that includes the reading or modification of a plurality of records, such as hundreds, thousands, hundreds of thousands, or millions, or more, of records. For example, in one embodiment, the batch processing may include crediting interest to thousands of different bank accounts. As described herein, the batch may also be referred to as a monolithic batch job.

Moreover, the batch may be split into a plurality of micro-batches. In one embodiment, the batch may split into a plurality of micro-batches based on a record interval. For example, the batch may split into a plurality of micro-batches of 100 records, such that modifications are committed after every 100 record modifications. In another embodiment, the batch may be split into a plurality of micro-batches based on a time interval. For example, the batch may split into a plurality of micro-batches such that modifications made to the records are committed every 5 seconds. Of course, such micro-batch intervals are simply examples, and the micro-batch interval may be set to include any number of records, or any time interval. In some embodiments, the commit of a micro-batch may be triggered by an external signal. However, the external signal may be ineffective to trigger the commit of the micro-batch if the micro-batch is currently idle waiting for an exclusive lock on a record.

Each micro-batch may accumulate and hold locks on records until the micro-batch reaches a commit point. Accumulated locks may cause contention with other workloads that are attempting to utilize (i.e., competing for) the same records. Moreover, potential contention increases with the number of locks held, and the duration of each individual lock hold time. In various embodiments, the duration of a lock hold time may be a function of the average per-record processing time of the batch job, and any wait for exclusive lock delays that the batch job experiences during I/O calls.

Also, a given system may experience various types of contention. For example, online transaction processing (OLTP) may experience delays by waiting for a micro-batch to release locks. Similarly, a batch or micro-batch job may experience delays while waiting for OLTP to release locks. Finally, a first batch or micro-batch job may experience delays while waiting for a second batch or micro-batch job to release locks.

In view of the above, it is understood that there are various trade-offs between sizing the micro-batches of a given monolithic batch job, and the speed with which the batch job will finish. Specifically, as the micro-batch size grows, a shorter batch job time may be realized, but potential contention between executing micro-batches increases as well. And as the micro-batch size decreases, the chance of potential contention between executing micro-batches decreases, but at the cost of an overall longer batch time due to commit overhead.

As shown at operation 304, processing of a micro-batch is started. Next, at operation 306, a record of the micro-batch is opened and locked. In various embodiments, a record is locked to ensure that a reading and/or modifying entity is in exclusive control of information contained in the record so that no other entity may modify the record while it is being used by the reading and/or modifying entity. In such embodiments, if a second entity were to request access to a locked record (i.e., while being the record is being used by a first entity), the second entity would need to wait until the first entity has completed using the record. The record may be locked until a commit, as described in more detail below.

Further, at operation 308, the record is processed. In one embodiment, processing the record may include reading values contained within the record. In another embodiment, processing the record may include updating values contained within the record. For example, in some embodiments, the record may include an account balance, credit usage, credit limit, etc. Further, the account balance, credit usage, credit limit, etc. may be modified during an update of the record.

Next, it is determined at operation 312 whether additional records are to be processed as part of the micro-batch processing started at operation 304. If it is determined at operation 312 that additional records are to be processed as part of the micro-batch, then another record is opened, locked, and processed, as noted above with respect to operations 306-308. Whether additional records are to be processed may depend upon a predetermined micro-batch interval.

In one embodiment, a micro-batch interval may include a predetermined number of records. Thus, additional records will be processed until the predetermined number of records (e.g., 50, 100, 500, 1,000, 10,000 records, etc.) have been processed. In another embodiment, a micro-batch interval may include a predetermined amount of time. Thus, additional records will be processed until the predetermined amount of time (e.g., 500 milliseconds, 1 second, 5 seconds, 10 seconds, 1 minute, etc.) has elapsed. Thus, in an iterative manner, records may be opened and updated during processing of a micro-batch. In various embodiments, the micro-batch may be processed in the same manner that a transaction would be processed on the system.

However, if it is determined at operation 312 that no additional records are to be processed as part of the micro-batch started at operation 304, then the micro-batch is committed at operation 314. In the context of the present description, committing a micro-batch may include releasing the opened records such that other entities may be allowed access to the records. For example, in one embodiment, another workload or process may need the contents of a record for processing another transaction, batch, or micro-batch. After the commit, the record is released and made available for the other workload or process.

In one embodiment, the commit of the micro-batch at operation 314 may indicate that processing of the micro-batch has completed successfully. More specifically, a commit may indicate that all transactional modifications or updates that occurred during operations 306-312 have been made permanent within storage of an operating environment. Still yet, a commit may free resources opened or accessed during operations 304-312.

After committing the micro-batch transaction, it is determined at operation 316 whether additional micro-batches are to be processed. If additional micro-batches are to be processed, then the method 300 returns to operation 304 to begin processing a next micro-batch, and operations 304-314, as described above, are repeated for records of the next micro-batch.

However, if no additional micro-batches need to be processed as part of the larger batch job, then batch processing has completed, and processing of the batch is finished at operation 318. In this manner, a monolithic batch job may be divided into chunks or partitions, referred to herein as micro-batches, where each of the micro-batches is processed as a transaction. Further, the one or more micro-batches may be processed in a manner that cooperates with a transactional workload concurrently being processed within the operating environment.

Figure 4A:
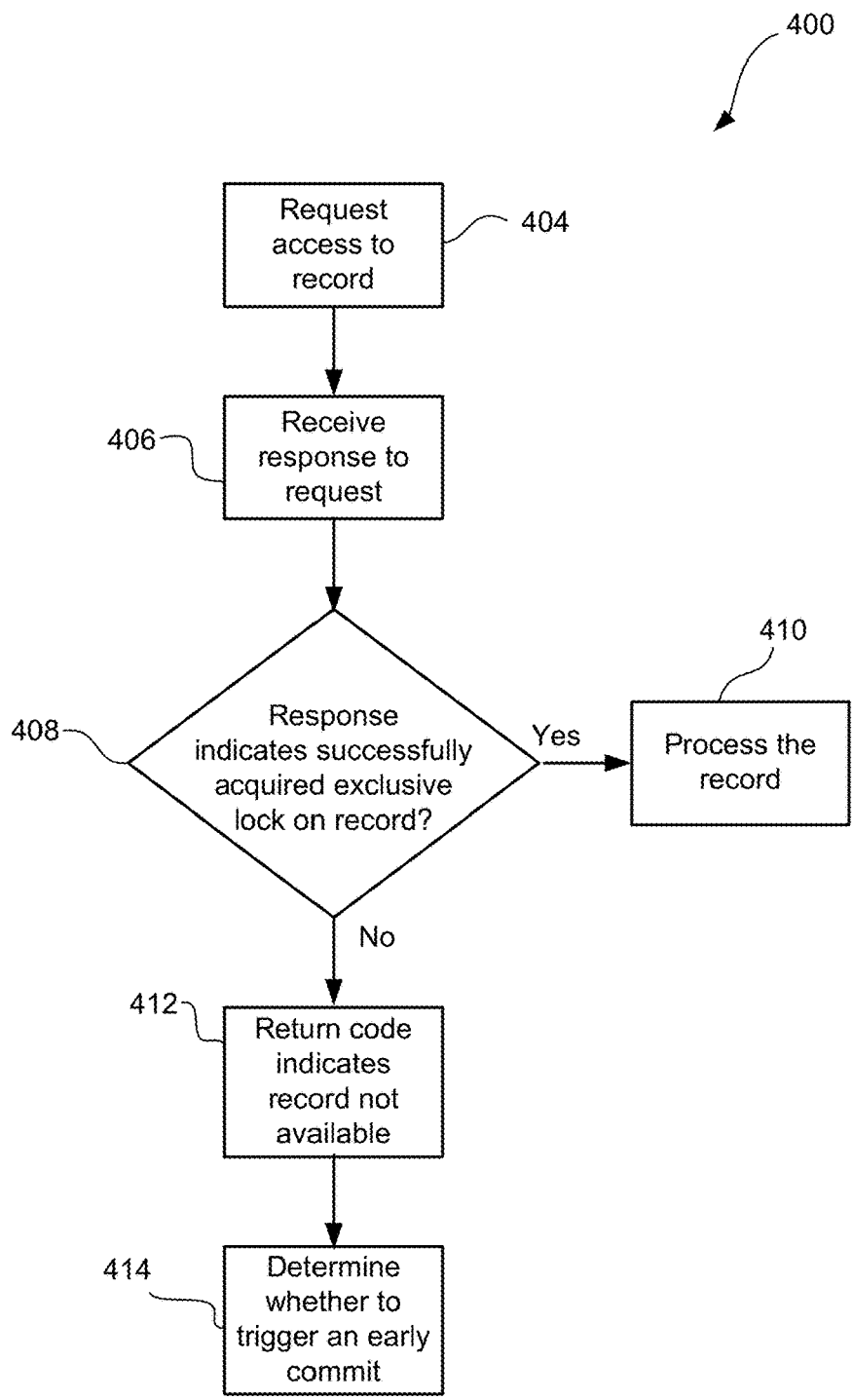
FIG. 4A illustrates a method for processing a micro-batch transaction using an opportunistic wait-triggered elastic commit, in accordance with one embodiment.

Now referring to FIG. 4A, a flowchart of a method 400, for processing a micro-batch transaction using an opportunistic wait-triggered elastic commit, is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, the method 400 includes requesting access to a record at operation 404, as part of processing a micro-batch transaction. Further, a response to the access request is received at operation 406.

In one embodiment, the record may include any unit of data maintained by an operating environment. Further, the access request may include a request to read the record, write the record, etc. The access to the record may be requested using a record retrieval call. For example, the access to the record may be requested using a record retrieval get record call. In various embodiments, the request to access the record may include a record retrieval call that requests an exclusive lock of the record.

At operation 408, it is determined whether the response indicates a successful acquisition of an exclusive lock on the record.

When an entity is granted an exclusive lock on the record, the entity may access the record to the exclusion of all other entities. Thus, when a first entity is granted an exclusive lock of the record, the exclusive lock may prevent other entities from accessing the record until the record is released by the first entity. In this way, it may be ensured that only one entity is accessing or modifying a given record at a given point in time.

Accordingly, in some circumstances, the record retrieval call may request access to a record that is already locked for use by another entity. In such circumstances, the entity that made the record retrieval call may then wait for the record to be released by the other entity. The entity that made the record retrieval call may wait for an extended period of time, and may acquire a lock on the record only after the record is released by the other entity. Or, in other words, in such circumstances, an I/O request that waits for exclusive access to a record does not return until the access has been granted or the request times out.

In another embodiment, the record retrieval call may include a read-no-wait get record call. The read-no-wait get record call may replace a typical record retrieval get record call. The read-no-wait get record call may indicate that a response to the record retrieval call should be returned immediately in response the record retrieval call regardless of whether the record is available or already locked. In a specific embodiment, the read-no-wait get record call may indicate that timeout=0 for the get record call. In another embodiment, the read-no-wait get record call may indicate a particular timeout, such as a timeout measured in milliseconds.

Thus, the calling entity may acquire an exclusive lock on the record, and the response to the record retrieval call may be returned immediately to include the record. Accordingly, if it is determined at operation 408 that the response indicates a successful acquisition of an exclusive lock on the requested record, then the record is processed at operation 410. The processing of the record at operation 410 may be substantially identical to the processing of the record set forth hereinabove with respect to operation 308 of method 300.

However, it may be determined at operation 408 that the response indicates that an exclusive lock on the requested record has not been acquired. If this is the case, then, at operation 412, a return code in the response indicates that the requested record is not available.

In various embodiments, the return code may include a flag, such that the response received to a read-no-wait get record call may include the flag instead of the requested record. The flag may indicate that an exclusive lock on the record was not successfully acquired, that the record is not available, and/or the flag may indicate that a wait is required. For example, the record may be locked for use by another entity, and the flag indicating that the record is not available is returned to the entity that that requested access at operation 404. In this manner, it may be communicated to the requesting entity that it must wait to access the record.

Thus, where a typical record retrieval get record call may result in the calling process waiting until the record is available, the read-no-wait get record call may result in a flag being immediately returned to the calling process.

Further, in response to the return code indicating that the record is not available, it is determined, at operation 414, whether to trigger an early commit. For example, in response to a determination that the response includes the flag, it may be determined whether to trigger an early commit of the micro-batch transaction. In other words, a decision may be made to dynamically commit a current unit of work earlier than the natural termination of the micro-batch transaction. In one embodiment, it may be determined to trigger the early commit of the micro-batch transaction in response to receiving the flag.

Thus, based on receiving the flag, instead of waiting until the record is available, the calling process may use the time that it would have been waiting for the record to instead commit the micro-batch. Committing the micro-batch early, instead of waiting for the requested record to become available, may help to reduce contention in the system, and prevent the propagation of contention to other workloads. For systems employing automatic micro-batching, logic supporting the read-no-wait get record call may be added without modifying the batch jobs.

Further, instead of remaining idle and waiting for access to the record, an early commit of the micro-batch transaction may release records that have been locked by the micro-batch transaction, thereby providing other processes with access to such records. Accordingly, when other processes are waiting for records locked by a given process, the other processes may be allowed to continue running as a result of the given process triggering an early commit in response to receiving the flag based on the read-no-wait get record call.

In this manner, because the given process would have otherwise spent the time required to make the commit waiting for the requested record to be released, interference with other workloads or processes may be reduced at no or very little cost to the batch job. This is especially true where collisions between two or more batch jobs result in exaggerated and expensive lock hold times and interference.

In various embodiments, after determining to trigger an early commit at operation 414, the process may retry requesting access to the record. The process may retry requesting access to the record using a second get record call. Still yet, the second get record call may include an indication that the process will wait for access to the record. For example, the process may include in the second get record call an indication that wait=TRUE. Thus, after the early commit, the access request may be tried again with a timeout typical of a traditional record retrieval call.

Figure 4B:
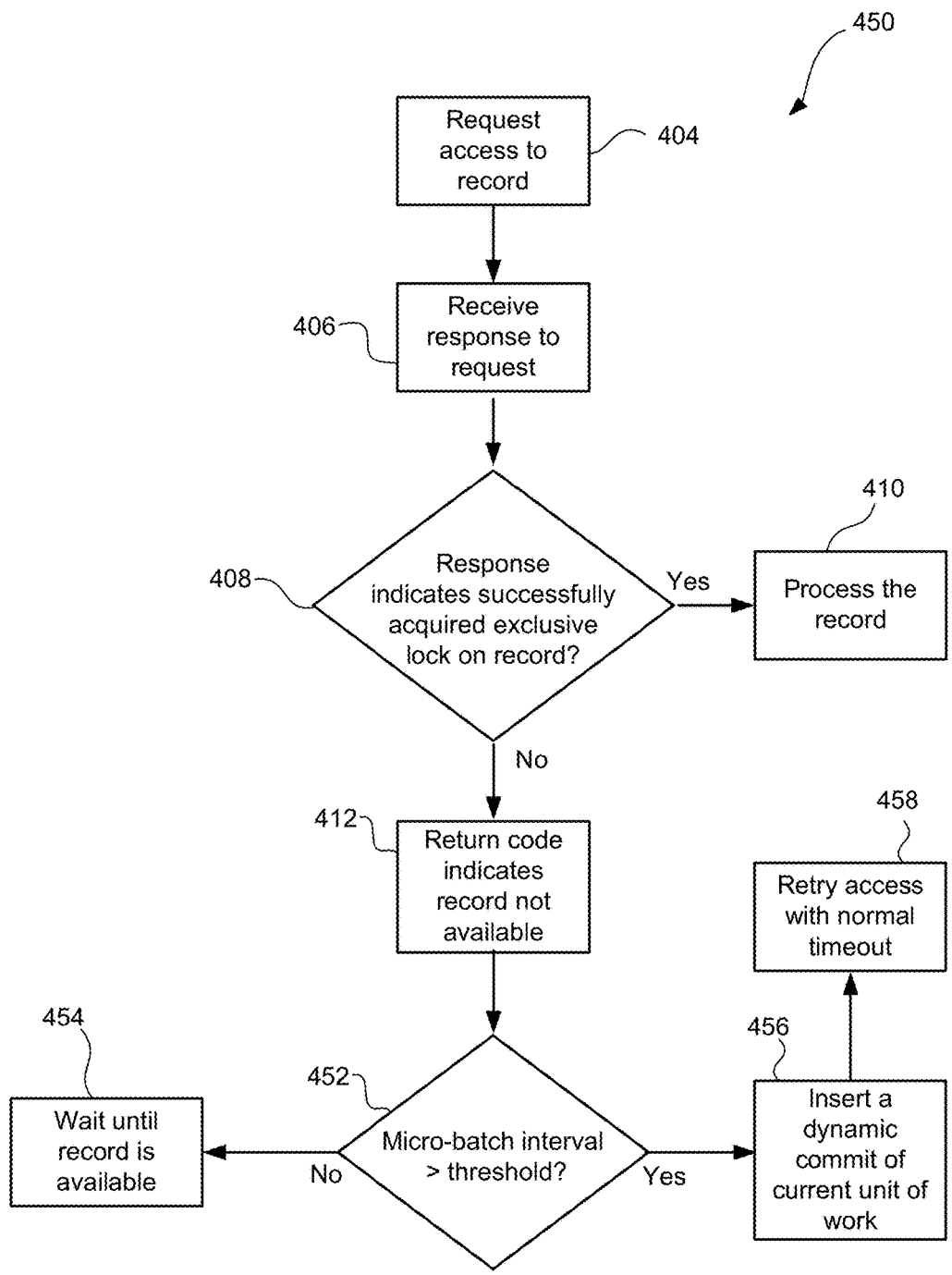
FIG. 4B illustrates a method for processing a micro-batch transaction using an opportunistic wait-triggered elastic commit, in accordance with another embodiment.

Referring to FIG. 4B, a flowchart of a method 450 for processing a micro-batch transaction using an opportunistic wait-triggered elastic commit, is shown according to one embodiment. The method 450 may be performed in accordance with the present invention in any of the environments depicted in FIGS. 1-3, among others, in various embodiments. Of course, more or less operations than those specifically described in FIG. 4B may be included in method 450, as would be understood by one of skill in the art upon reading the present descriptions.

Each of the steps of the method 450 may be performed by any suitable component of the operating environment. For example, in various embodiments, the method 450 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

Referring now to FIG. 4B, operations 404-412 of the method 450 may be substantially identical to operations 404-412 of the method 400 described in the context of FIG. 4A.

Within the method 450, when a return code indicates that the requested record is not available at operation 412, then in response it is determined, at operation 452, whether a current micro-batch interval is greater than a threshold. In this way, the micro-batch interval may be used to determine whether to trigger an early commit. More specifically, if at operation 452 it is determined that the micro-batch interval is not greater than the threshold, then the process will wait, at operation 454, until the record is available.

However, if at operation 452 it is determined that the micro-batch interval is greater than the threshold, then the current unit of work is dynamically committed at operation 456. As described previously, in one embodiment, the dynamic commit of the current unit of work may include committing the current micro-batch.

In this manner, if the commit time of the micro-batch is less than or equal to the minimum average delay experienced when waiting for a lock on a record, then early commits which occur during periods when the batch job would otherwise be waiting are essentially free with respect to batch job execution time. Opportunistically committing the current work, instead of waiting for a lock on a record, is unlikely to have a negative impact on batch job execution time. Even more, opportunistically committing the current work, instead of waiting for a lock on a record, may reduce the average contention footprint of the batch job, as well as break or prevent any propagating, cascading delays among other batch jobs and transactions.

The threshold may include any value or quantitative aspect by which a micro-batch may be measured. In one embodiment, the threshold may include a number of records. For example, the threshold may be set to 50, 100, 200, 500, 1,000, or any other number of records. In such an embodiment, if the number of records locked for use by the micro-batch transaction is greater than the threshold when the return code indicates that the requested record is not available, then an early commit is triggered. The threshold may include any predetermined value intended to keep the environment from triggering early commits of small data sets that are unlikely to create a minimal level of contention.

In another embodiment, the threshold may include a time limit. For example, the threshold may be set to include a time limit measured in milliseconds, seconds, minutes, etc. In this embodiment, if the elapsed running time of the micro-batch transaction is greater than the threshold when the return code indicates that the requested record is not available, then an early commit is triggered. As another option, the threshold may include a duration of the longest held lock of the micro-batch transaction. For example, if the micro-batch has held a lock on any record for an amount of time greater than the threshold when the return code indicates that the requested record is not available, then an early commit is triggered.

Thus, the interval of the micro-batch may be evaluated relative to the threshold to determine whether to trigger an early commit. In one embodiment, where an early commit is always preferred, the micro-batch interval threshold may be set to 0, i.e., 0 milliseconds or 0 records. A threshold of 0 may be utilized in environments that experience a large number of batch-batch interactions. Because contention due to batch-batch interactions tends to accumulate more quickly than contention due to batch-transaction interactions, a threshold of 0 may benefit such environments.

Still yet, after dynamically committing the current unit of work, the access request is retried with a normal timeout at operation 458. Or, in other words and as described above, after the early commit, the access request may be tried again with a timeout typical of a traditional record retrieval call.

Exemplary pseudo code for processing a micro-batch transaction using an opportunistic wait-triggered elastic commit is included below in Table 1.

TABLE 1

```
for j=1 to N
    begin microbatch transaction
    for i=1 to n
        j++
        read-no-wait record exclusive
        if record not ready
            commit microbatch transaction
            begin microbatch transaction
            read-wait record exclusive
        process record
        update record
        if (early commit advice)
            break
    end
    commit microbatch transaction
end
```

In another embodiment, micro-batch profile information may be available for use in determining whether to insert a dynamic commit of the current unit of work. More specifically, the micro-batch profile information may be used to determine whether trigger an early commit of the micro-batch transaction. Thus, the micro-batch profile information may be evaluated to determine whether to trigger an early commit of the micro-batch transaction.

In one embodiment, the micro-batch profile information may be used, in lieu of a comparison of a micro-batch interval to a threshold, to determine whether to trigger an early commit. More specifically, instead of comparing a micro-batch interval to a threshold, micro-batch profile information may be evaluated to determine whether to trigger an early micro-batch commit.

In another embodiment, an early commit of a micro-batch transaction may be triggered based on micro-batch profile information even when the micro-batch interval is less than the threshold. In other words, the micro-batch profile information may be used to override a determination, made at operation 452, to wait until a record is available.

The micro-batch profile information may include information about micro-batch waiters in the operating environment. A micro-batch waiter may include any job, thread, task, batch, micro-batch, or transaction that intends to access a resource being held by another job, thread, task, batch, micro-batch, or transaction. In particular, the information about the micro-batch waiters may include a number of micro-batch waiters, a cumulative wait time of the micro-batch waiters, an average wait time of the micro-batch waiters, and/or whether any of the micro-batch waiters are in near-term jeopardy of timing out (e.g., a predetermined number of milliseconds, seconds, etc. away from timing out). Thus, in order to reduce global contention, an early commit of a micro-batch transaction may be triggered based on the characteristics of other jobs, threads, tasks, batches, micro-batches, or transactions that are waiting for access to locked resources.

In this manner, locking interference between batch jobs and other workloads may be dynamically adjusted. Further, implementing a read-no-wait get record call may allow the system to default to larger micro-batches without negative impacts on batch job performance because batch-batch interference is less likely to result in cascading waits that negatively impact response times.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    During a micro-batch transaction, requesting access to a record using a record retrieval get record call;
    Receiving a response to the record retrieval get record call, wherein the record retrieval get record call comprises a read-no-wait get record call that indicates the response to the record retrieval get record call should be returned immediately in response to the record retrieval get record call regardless of whether the record is available or already locked;
    Determining whether the response includes one of the record and a flag;
    In response to a determination that the response includes the record, processing the record; and
    In response to a determination that the response includes the flag, determining whether to trigger an early commit of the micro-batch transaction, wherein the early commit of the micro batch transaction is triggered based on a threshold, wherein the early commit of the micro-batch transaction is triggered based on a comparison of an interval to the threshold, wherein the threshold includes a number of records, such that the early commit of the micro-batch transaction is triggered based on a number of locked records associated with the micro-batch transaction being greater than the number of records of the threshold.

2. The method of claim 1, wherein the micro-batch transaction accumulates locks on a plurality of records until the commit of the micro-batch transaction.

3. The method of claim 1, wherein the number of records of the threshold 0.

4. The method of claim 1, wherein the read-no-wait get record call indicates that timeout=0 for the record retrieval get record call.

5. The method of claim 1, wherein the response includes the flag and the early commit of the micro-batch transaction is triggered; and
    further comprising re-requesting access to the record using a second record retrieval get record call after the early commit of the micro-batch transaction is triggered, wherein the second record retrieval get record call includes an indication that access to the record will be waited for.

6. The method of claim 1, further comprising evaluating micro-batch profile information when determining whether to trigger the early commit of the micro-batch transaction.

7. The method of claim 6, wherein the micro-batch profile information includes information about at least one micro-batch waiter.

8. The method of claim 7, wherein the micro-batch profile information includes a number of the at least one micro-batch waiter.

9. The method of claim 7, wherein the micro-batch profile information includes a cumulative wait time of the at least one micro-batch waiter.

10. The method of claim 7, wherein the micro-batch profile information include an indication of whether any micro-batch waiter of the at least one of the micro-batch waiter is in near-term jeopardy of timing out.

11. A computer program product for processing a micro-batch transaction using an opportunistic wait-triggered elastic commit, the computer program product comprising a computer readable storage medium having program instructions embodied therewith, the program instructions executable by a processor to cause the processor to:
    during a micro-batch transaction, request access to a record using a record retrieval get record call;
    receive a response to the record retrieval get record call, wherein the record retrieval get record call comprises a read-no-wait get record call that indicates the response to the record retrieval get record call should be returned immediately in response the record retrieval get record call regardless of whether the record is available or already locked;
    determine whether the response includes one of the record and a flag;
    in response to a determination that the response includes the record, process the record; and
    in response to a determination that the response includes the flag, determine whether to trigger an early commit of the micro-batch transaction, wherein the early commit of the micro-batch transaction is triggered based on a threshold, wherein the early commit of the micro-batch transaction is triggered based on a comparison of an interval to the threshold, wherein the threshold includes a number of records, such that the early commit of the micro-batch transaction is triggered based a number of locked records associated with the micro-batch transaction being greater than the number of records of the threshold.

12. A system, comprising:

a processor and logic integrated with and/or executable by the processor, the logic being configured to:
  during a micro-batch transaction, request access to a record using a record retrieval get record call;
  receive a response to the record retrieval get record call, wherein the record retrieval get record call comprises a read-no-wait get record call that indicates the response to the record retrieval get record call should be returned immediately in response the record retrieval get record call regardless of whether the record is available or already locked, wherein the read-no-wait get record call indicates that timeout=0 for the record retrieval get record call;
  determine whether the response includes one of the record and a flag;
  in response to a determination that the response includes the record, process the record;
  in response to a determination that the response includes the flag, determine whether to trigger an early commit of the micro-batch transaction, wherein the early commit of the micro-batch transaction is triggered based on a threshold, wherein the early commit of the micro-batch transaction is triggered based on a comparison of an interval to the threshold, wherein the threshold includes a number of records, such that the early commit of the micro-batch transaction is triggered based a number of locked records associated with the micro-batch transaction being greater than the number of records of the threshold, wherein the response includes the flag and the early commit of the micro-batch transaction is triggered;
  re-requesting access to the record using a second record retrieval get record call after the early commit of the micro-batch transaction is triggered; and
  evaluating micro-batch profile information when determining whether to trigger the early commit of the micro-batch transaction, wherein the micro-batch profile information includes information about at least one micro-batch waiter, wherein the micro-batch profile information includes a number of the at least one micro-batch waiter, wherein the micro-batch profile information includes a cumulative wait time of the at least one micro-batch waiter, wherein the micro-batch profile information include an indication of whether any micro-batch waiter of the at least one of the micro-batch waiter is in near-term jeopardy of timing out.

* * * * *